United States Patent [19]

Graham et al.

[11] Patent Number: 5,469,374
[45] Date of Patent: Nov. 21, 1995

[54] AUTOMATIC DATA SEGMENTATION MODULE FOR TARGET MOTION ANALYSIS APPLICATIONS

[75] Inventors: Marcus L. Graham, North Kingstown, R.I.; John F. MacDonald, Westport, Mass.; Kai F. Gong, Pawtucket, R.I.; Kathleen D. Keay, Fairhaven, Mass.

[73] Assignee: The United States of America as represented by the Secretary of the Navy, Washington, D.C.

[21] Appl. No.: 83,404

[22] Filed: Jun. 23, 1993

[51] Int. Cl.⁶ .................................................. G06F 17/00
[52] U.S. Cl. ................................................................ 364/516
[58] Field of Search ..................................... 364/514, 516; 342/159, 660

[56] References Cited

U.S. PATENT DOCUMENTS

| | | |
|---|---|---|
| 4,601,055 | 7/1986 | Kent ........................................ 364/514 |
| 4,860,216 | 8/1989 | Linsenmayer ........................... 364/516 |
| 5,036,474 | 7/1991 | Bhanu et al. ............................ 364/516 |
| 5,315,538 | 5/1994 | Borrell et al. .......................... 364/516 |

*Primary Examiner*—Ellis B. Ramirez
*Attorney, Agent, or Firm*—Michael J. McGowan; Mitchael F. Oglo; Prithvi C. Lall

[57] ABSTRACT

A system having a device for comparing incoming data with hypotheses previously formed from prior data for providing new hypotheses on target information. It has application when the data source is from either single or multiple targets. The incoming datum to the system forms new hypotheses assuming the incoming datum is invalid, forms new hypotheses assuming the new datum begins a new segment of information, and forms new hypotheses assuming the new datum is associated with segments in prior retained hypotheses. The one hypothesis of the thusly formed new hypotheses with the greatest likelihood of target information is then selected for further analyzation and the hypothesis selected and other hypotheses are retained for further processing with new incoming datum.

5 Claims, 2 Drawing Sheets

AUTOMATIC DATA SEGMENTATION MODULE FOR TARGET MOTION ANALYSIS APPLICATIONS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

The present invention relates to target motion analysis. It provides a means for automated partitioning of a data sequence into "segments" each of which contains data with homogenous characteristics. Boundaries between data segments correspond to likely event times such as changes in the measurement process or shifts in a state parameter description. Automatic segmentation is required for current state-of-the-art target motion analysis algorithms for submarine applications.

(2) Description of the Prior Art

Performance of underwater target motion analysis is contingent upon the ability to partition the measurement sequence into segments each of which is homogeneous in nature. Historically, segments have been delineated using known events such as changes in observer motion or by human intervention such as a computer operator inputting his or her judgment concerning segment boundaries upon observing a display of the data sequence.

Other traditional techniques for automatic data segmentation are typically divisive in nature and initially assume that all measurements within a time series belong together. These techniques examine the time series for features or changes in characterizing parameters which would correspond to segment boundaries. When measurements are made on multiple sources the problem of measurement to source association must be addressed. When it can no longer be assumed that all measurements belong to the same source, the data set must be partitioned according to its origin as well as partitioned in time. A traditional divisive technique is the sliding window approach, which is generally effective for purposes or partitioning in time. However, this technique is not amenable to partitioning according to its origin as well as partitioning in time.

SUMMARY OF THE INVENTION

Accordingly, it is a general purpose and object of the present invention to provide improved data for target motion analysis applications. It is a further object to partition the data into segments of data with homogeneous characteristics. It is another object to achieve the above goals in both single source and multiple source environments. Further objects are that the system can be customized to retain only as much data as the processing resources are capable of handling and that this retained data be the preferred data available.

These objects are accomplished with the present invention by providing a system which associates each segment in existing hypotheses in the current data base with incoming datum to form a new segment. Heuristic rules rooted in insights into the underlying physical processes are employed, such as data gating and data gap limitation, to reduce the computational burden and improve performance. Updated segment estimates are then made using a linear Kalman filter. New hypotheses are formed assuming the new datum is associated with previous segments. In addition a new hypothesis is formed assuming the new datum is invalid and a new hypothesis is formed using the assumption the new datum begins a new segment. Each hypothesis is scored on the likelihood of successful segmentation and the hypothesis with the highest score is selected and further analyzed. The above process is then repeated.

BRIEF DESCRIPTION OF THE DRAWINGS

The present invention may be better understood and its numerous objects and advantages will become apparent to those skilled in the art by reference to the accompanying drawings, wherein like reference numerals refer to like elements in the several figures, in which.

DESCRIPTION OF THE PREFERRED EMBODIMENT

Figure 1:
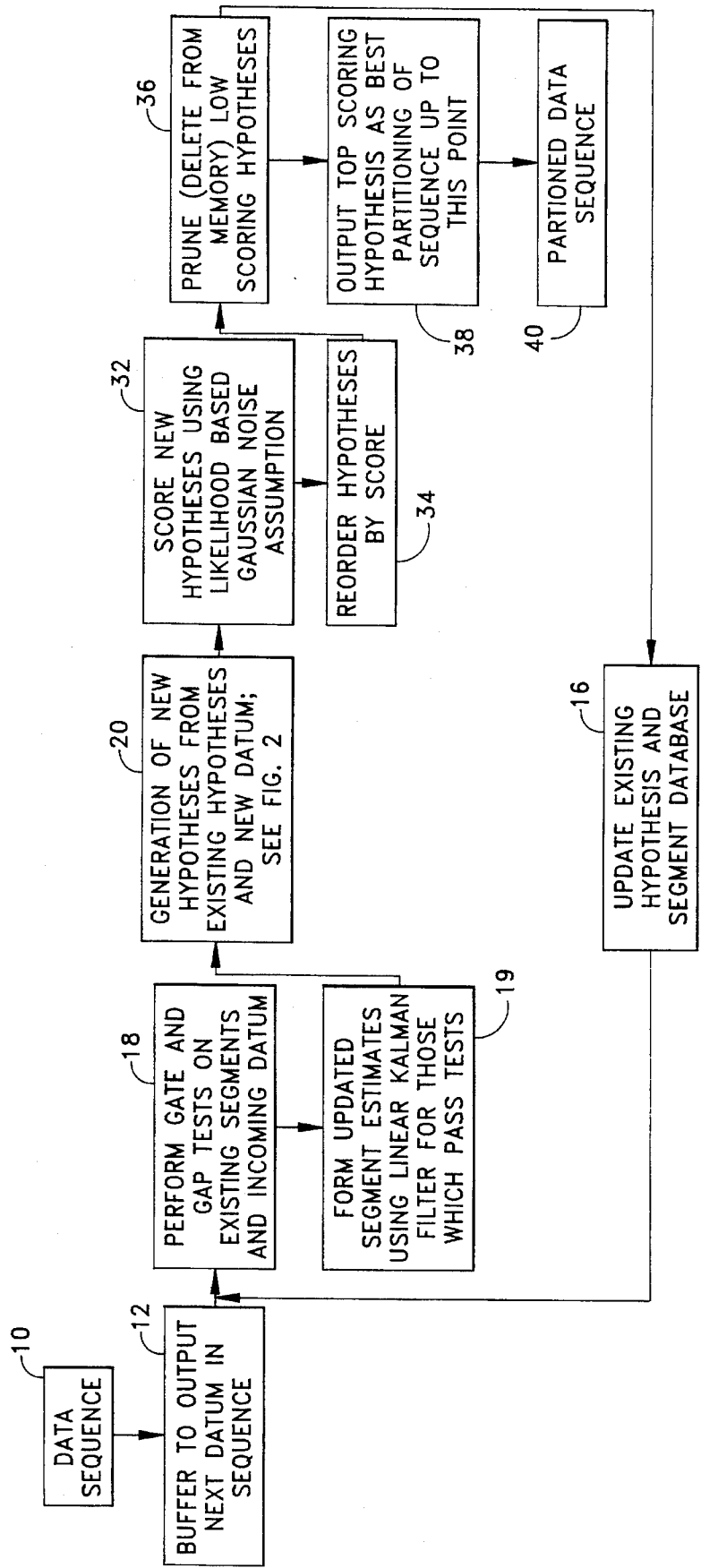
FIG. 1 is a system providing automatic data segmentation in accordance with the present invention.
Figure 2:
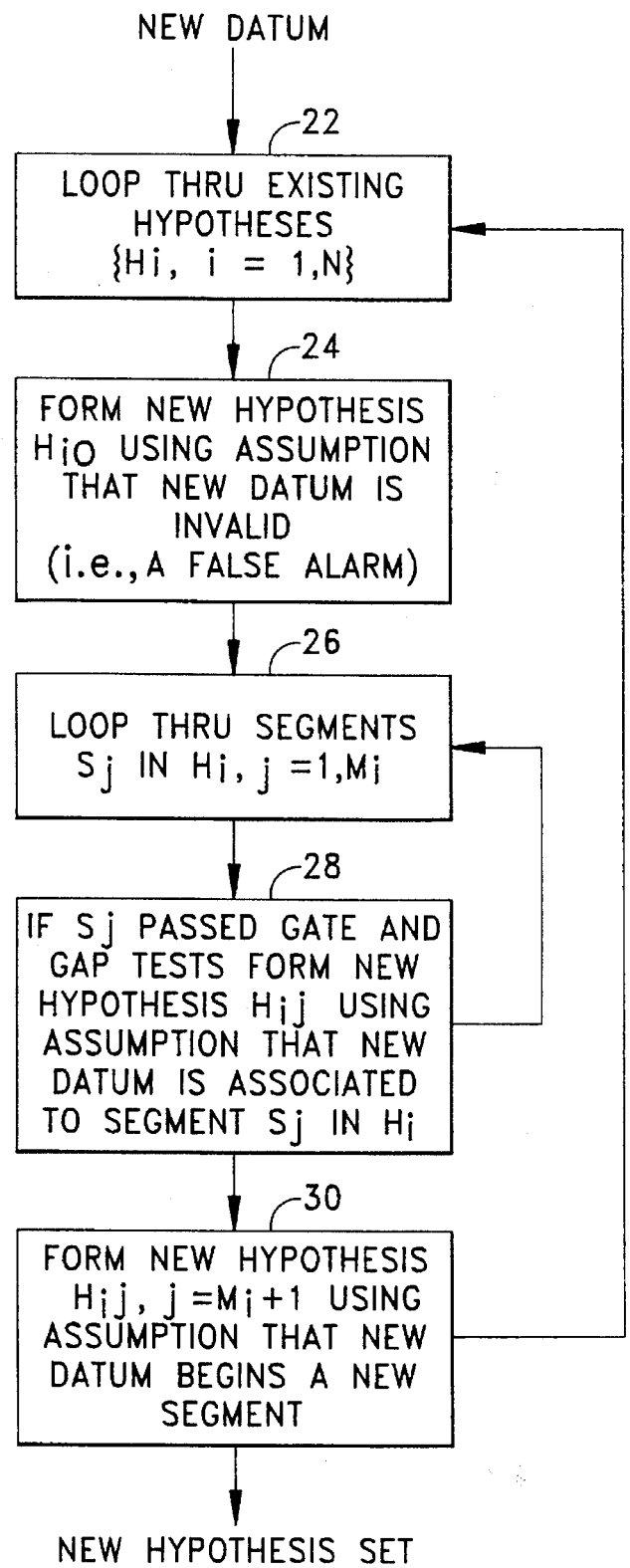
FIG. 2 is a flow diagram giving a more detailed explanation of the hypothesis prediction block of FIG. 1.

The individual methods for multiple hypothesis management described in this application and outlined within the blocks of FIGS. 1 and 2 are well known to those of skill in the art and are fully documented in the technical literature on data fusion. The selection and arrangement of the particular methods chosen for partitioning a time series into segments are new. Implicit is the maintenance of necessary data structures required to retain and access the pertinent information concerning hypotheses and segments.

Refer now to FIG. 1 wherein there is shown a block diagram of the inventive system. A data sequence 10, that is to be partitioned, is input from buffer 12, one datum at a time, to a subsequent algorithm at block 18. The set of existing hypotheses at block 16 is initially established as a single hypothesis containing no segments. The existing hypotheses and corresponding segments at block 16 are also input at block 18. At this point block 18 employs heuristic rules rooted in insights into the underlying physical processes by comparing the incoming datum to existing segments from block 16 thereby reducing the computational burden and improving performance. Examples of such heuristic rules shown are data gating and data gap limitations. Data gating examines the difference between the current datum and the predicted value based on the regression line of the segment in question. If this difference is greater than some predefined "gate" the association to that segment is immediately eliminated from consideration. Data gap limitation examines the time gap between the datum and the time of the last datum in the segment. As with data gating, data gaps larger than some predefined limit result in rejected segment association. New segment estimates are then formed using a linear Kalman filter, in block 19, for those segments that pass the gate and gap tests of block 18. The Kalman filter of block 19 is an algorithm widely disseminated in the technical literature on filtering and estimation theory. Here, the Kalman filter estimates first order polynomial regression parameters along with the corresponding covariance.

A hypothesis is a partitioning of the data sequence into a set of segments. In the set of existing hypotheses at block 16 each represents a different partitioning of the data sequence, i.e. is unique in one or more segments. Each existing hypothesis, in conjunction with the new datum, spawns a set of new hypotheses based on the association possibilities of the new datum. Block 20 describes the generation of new hypotheses from the existing hypotheses and the new datum. A diagram of this is shown in FIG. 2.

Refer now to FIG. 2. The block 22 sequences through the existing hypotheses originating in block 16. Block 24 forms an additional hypothesis element for the currently considered hypothesis from block 22 using the assumption that the new datum is invalid.

Blocks 26 and 28 sequence through each of the individual segments in the currently considered hypothesis from block 22, which individual segments can be analytically designated $S_j$, with j inclusive of indices 1 - $M_1$. For each segment that passed the gate and gap tests of block 18 in FIG. 1 a new hypothesis is formed using the assumption that the new datum is associated with that particular segment.

Block 30 forms a new hypothesis, using the currently considered hypothesis and the assumption that the new datum begins a new segment. The cycle then returns to block 22 to consider the next hypothesis, until all hypotheses originating in block 16 have been considered.

In summary, FIG. 2 generates a new hypothesis, for each existing hypothesis, assuming the new datum is invalid, generates a new hypothesis, for each existing hypothesis, assuming the new datum begins a new segment, and generates a plurality of new hypotheses, one for each segment of the existing hypotheses that passed the gate and gap test. Each of the plurality of new hypotheses formed, one for each segment that passed the gate and gap test uses the assumption that the new datum is associated with the particular segment that passed the gate and gap test.

Each hypothesis generated in FIG. 2 is applied to block 32 and is scored using likelihoods based on a Gaussian noise assumption and a-priori probabilities of the datum coming from a new segment or being invalid. The hypotheses are then reordered by their relative scores in block 34.

Block 36 then deletes those hypotheses with a relatively low score corresponding to a low likelihood of successful segmentation. In addition, due to the fact that as a data sequence is processed the number of hypotheses continually increases. The maximum number of hypotheses carried may exceed the threshold that the processing resources are capable of handling. Should this happen, only a predetermined number of hypotheses present can be retained. The hypotheses retained are those with the highest scores as determined in block 32. The remaining hypotheses are deleted even if their score is high enough to show a likelihood of successful segmentation.

Block 38 then outputs the single top scoring hypothesis to block 40 as the best segmentation of the sequence up to the current datum.

The surviving hypothesis set from the pruning in block 36 is then forwarded to block 16. This includes the top scoring hypothesis that was forwarded to block 40. Block 16 then updates the existing hypothesis and segment database, whereupon the system is then ready for the next datum in sequence.

There has therefore been described a multiple hypothesis technique that is an agglomerative technique. It builds segments by iteratively associating measurements together rather than dividing a larger sequence into segments by drawing boundaries. As a result, the multiple hypothesis technique is more easily adapted to handling data from multiple sources. As used in this disclosure the multiple hypothesis technique evaluates the measurement-to-segment association. In a single source environment the result is a partitioning of the time series into segments which will in general not overlap in time. In a multiple source environment, where measurements of different sources may arrive concurrently, segments which overlap in time exist. Segments which exist concurrently are partitioned according to measurement source, with the beginning and end of the segments representing a partitioning of the measurements from each source in time. Furthermore, the technique permits points to be considered invalid, providing automated editing of poor quality data.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. A target motion multiple hypotheses selection process for operating on a received data sequence for providing automatic data segmentation including forming new hypotheses and the selecting and outputting of the new hypothesis formed with the most likelihood of successful segmentation for target motion analysis application comprising the steps of:

retaining a set of existing hypotheses in a data base;

combining each such existing hypothesis with new hypotheses on the basis of an assumption that incoming datum to form a new datum is invalid;

combining each such existing hypothesis with incoming datum to form new hypotheses on the basis of an assumption that the new datum is associated with previous segments and updating these segments to include the new datum;

combining each such existing hypothesis with incoming datum to form a new hypotheses on the basis of an assumption that the new datum begins a new segment;

selecting and outputting the one new hypothesis formed with the most likelihood of successful segmentation; and returning each new hypothesis formed to said data base for further processing with incoming datum.

2. A target motion multiple hypotheses selection process for operating on a received data sequence for providing automatic data segmentation including forming new hypotheses and the selecting and outputting of the new hypothesis formed with the most likelihood of successful segmentation for target motion analysis application according to claim 1 wherein said updating each of the retained segments utilizes a linear Kalman filter for estimating first order polynomial regression parameters along with the corresponding covariance for updating each of said new segments.

3. A target motion multiple hypotheses selection process for operating on a received data sequence for providing automatic data segmentation including forming new hypotheses and the selecting and outputting of the new hypothesis formed with the most likelihood of successful segmentation for target motion analysis application according to claim 2 wherein each new hypothesis formed is scored on the likelihood of being a successful segmentation based on a Gaussian noise assumption and a-priori probabilities of the datum coming from a new segment or being invalid.

4. A target motion multiple hypotheses selection process for operating on a received data sequence for providing automatic data segmentation including forming new hypotheses and the selecting and outputting of the new hypothesis formed with the most likelihood of successful segmentation for target motion analysis application according to claim 3 wherein each hypothesis obtaining a score below a predetermined level on the likelihood of successful segmentation being deleted.

5. A target motion multiple hypotheses selection process for operating on a received data sequence for providing automatic data segmentation including forming new hypotheses and the selecting and outputting of the new hypothesis formed with the most likelihood of successful segmentation for target motion analysis application according to claim 4 wherein only a predetermined number of hypotheses are retained with the others being deleted and the hypotheses retained have higher scores than those deleted.

* * * * *